US009313788B2

(12) United States Patent
Fudickar et al.

(10) Patent No.: US 9,313,788 B2
(45) Date of Patent: Apr. 12, 2016

(54) MOBILE DEVICE FOR WIRELESS DATA COMMUNICATION AND A METHOD FOR COMMUNICATING DATA BY WIRELESS DATA COMMUNICATION IN A DATA COMMUNICATION NETWORK

(71) Applicant: UNIVERSITÄT POTSDAM, Potsdam (DE)

(72) Inventors: Sebastian Fudickar, Potsdam (DE); Max Frohberg, Potsdam (DE); Phillip Mahr, Berlin (DE); Bettina Schnor, Potsdam (DE)

(73) Assignee: UNIVERSITÄT POTSDAM (DE)

( * ) Notice: Subject to any disclaimer, the term of this patent is extended or adjusted under 35 U.S.C. 154(b) by 0 days.

(21) Appl. No.: 14/377,195

(22) PCT Filed: Feb. 8, 2013

(86) PCT No.: PCT/EP2013/052606
§ 371 (c)(1),
(2) Date: Aug. 7, 2014

(87) PCT Pub. No.: WO2013/117734
PCT Pub. Date: Aug. 15, 2013

(65) Prior Publication Data
US 2015/0005024 A1    Jan. 1, 2015

(30) Foreign Application Priority Data
Feb. 10, 2012    (EP) .................................. 12 154 967

(51) Int. Cl.
*H04W 72/04*    (2009.01)
*H04M 1/725*    (2006.01)
(Continued)

(52) U.S. Cl.
CPC ........ *H04W 72/0453* (2013.01); *H04M 1/7253* (2013.01); *H04W 4/02* (2013.01); *H04W 88/02* (2013.01); *H04M 2250/12* (2013.01); *H04M 2250/22* (2013.01); *H04W 52/0209* (2013.01)

(58) Field of Classification Search
CPC ....................... H04M 1/7253; H04M 2250/12
USPC ................ 455/452.1, 41.1, 550.1, 90.1, 551, 455/552.1, 67.11; 345/169, 156, 175, 177
See application file for complete search history.

(56) References Cited

U.S. PATENT DOCUMENTS

| 4,903,257 A | 2/1990 | Takeda et al. |
| 2009/0153490 A1* | 6/2009 | Nymark ............ H04M 1/72519 345/169 |

(Continued)

FOREIGN PATENT DOCUMENTS

WO    2010037218 A1    4/2010

OTHER PUBLICATIONS

International Search Report; PCT/EP2013/052606; International Filing Date: Feb. 8, 2013; Universitaet Potsdam; 3 pgs.
(Continued)

*Primary Examiner* — John J Lee
(74) *Attorney, Agent, or Firm* — Schmeiser, Olsen & Watts, LLP

(57) ABSTRACT

The invention relates to a mobile device for wireless data communication, the device comprising the following functional units a central data processing unit, a memory unit, a display element, a user interface, a power supply unit, and a wireless transceiver configured for wireless data communication using the same frequency ranges of the sub 1 GHz frequency band for both sending and receiving data, each of the functional units being functionally connected to at least the central data processing unit. Furthermore, a method for communicating data by wireless data communication in a data communication network is disclosed.

4 Claims, 4 Drawing Sheets

Figure 1:
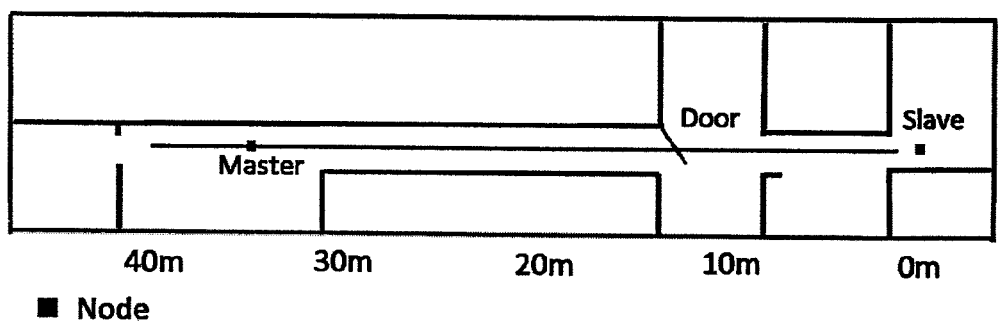

(51) Int. Cl.
*H04W 4/02* (2009.01)
*H04W 88/02* (2009.01)
*H04W 52/02* (2009.01)

(56) References Cited

U.S. PATENT DOCUMENTS

2010/0081374 A1* 4/2010 Moosavi .............. G06K 7/0008
 455/41.1
2010/0214267 A1* 8/2010 Radivojevic .......... G06F 1/1616
 345/175

OTHER PUBLICATIONS

Fudickar et al., "A Mobile Orientation System for Dementia Patients," in Proc. of International Conference on Intelligence Interactive Assistance and Mobile Multimedia Computing, Rostock, Germany, Nov. 2009.
Fudickar et. al., "KopAL—An Orientation System for Patients With Dementia," in Behaviour Monitoring and Interpretation—BMI. IOS Press, 2011, pp. 83-104.
Kaplan et al., Understanding GPS: principles and applications, 2nd ed. Artech House, 2005.
Varshavsky et al., "GSM indoor localization," Pervasive Mob. Comput., vol. 3, pp. 698-720, Dec. 2007.
Ni et al., "Landmarc: indoor location sensing using active rfid," Wirel. Netw., vol. 10, pp. 701-710, Nov. 2004.
Cox et al., "Intellibadge: Towards providing location-aware value-added services at academic conferences," UbiComp 2003 Ubiquitous Computing, vol. 2864, pp. 264-280, 2003.
Kyamakya et al., "An indoor Bluetoothbased positioning system: concept, implementation and experimental evaluation," International, 2003.
Bahl et al., "RADAR: an in-building RF based user location and tracking system," INFOCOM 2000. Nineteenth Annual Joint Conference of the IEEE Computer and Communications Societies. Proceedings. IEEE, vol. 2, pp. 775-784 vol. 2, 2000.
Hightower et al., "Practical lessons from place lab," IEEE Pervasive Computing, vol. 5, pp. 32-39, Jul. 2006.
Smith et al., "Tracking Moving Devices with the Cricket Location System," in 2nd International Conference on Mobile Systems, Applications and Services (Mobisys 2004), Boston, MA, Jun. 2004.
Gezici et al., "Localization via ultra-wideband radios: a look at positioning aspects for future sensor networks," Signal Processing Magazine, IEEE, vol. 22, No. 4, pp. 70-84, 2005.
M. Kranz et al., "A comparative study of DECT and WLAN signals for indoor localization," in 8th Annual IEEE Int'l Conference on Pervasive Computing and Communications (PerCom 2010). Mannheim, Germany: IEEE, Mar. 2010, pp. 235-243.
Savarese et al., "Locationing in distributed ad-hoc wireless sensor networks," in in ICASSP, 2001, pp. 2037-2040.
Cheng et al., "Accuracy characterization for metropolitan-scale wi-fi localization," in Proceedings of the 3rd international conference on Mobile systems, applications, and services, ser. MobiSys '05. New York, NY, USA: ACM, 2005, pp. 233-245.

J. D. Parsons, The Mobile Radio Propagation Channel, 2nd Edition, 2nd ed. Wiley, Nov. 2000.
Hossain et al., "A Comprehensive Study of Bluetooth Signal Parameters for Localization," in Proc. IEEE PIMRC, Athens, Greece, Sep. 2007.
Zhou et al., "Position measurement using Blue-tooth," IEEE Transactions on Consumer, 2006.
Cho et al., Performance Tests for Wireless Real-time Localization Systems to Improve Mobile Robot Navigation in Various Indoor Environments, 2008.
Elnahrawy et al., "The limits of localization using signal strength: a comparative study," 2004, pp. 406-414.
Chandrasekaran et al., "Empirical evaluation of the limits on localization using signal strength," in Proceedings of the 6th Annual IEEE communications society conference on Sensor, Mesh and Ad Hoc Communications and Networks, ser. SECON'09. Piscataway, NJ, USA: IEEE Press, 2009, pp. 333-341.
Otsason et al., "Accurate gsm indoor localization," in UbiComp 2005: Ubiquitous Computing, ser. Lecture Notes in Computer Science, M. Beigl, S. Intille, J. Rekimoto, and H. Tokuda, Eds. Springer Berlin / Heidelberg, 2005, vol. 3660, pp. 903-903.
Rosum tv-gps,Website, 2011, available online at http://www.trueposition.com/visited on Sep. 15, 2011.
Hightower et al., "Particle filters for location estimation in ubiquitous computing: A case study," in Proceedings of the Sixth International Conference on Ubiquitous Computing (Ubicomp 2004), ser. Lecture Notes in Computer Science.
Balakrishnan et al., "Lessons from developing and deploying the cricket indoor location system," Tech. Rep., 2003.
IEEE 802.15.1-2005 IEEE Standard for information technology—Telecommunication and information exchange between systems—LAN / MAN—Part 15.1: Wireless Medium Access Control (MAC) and Physical Layer (PHY) specifications for Wireless Personal Area Networks (WPANs), 2005.
Tao 3530w, Website, 2011, available online at url http://www.denx-cs.de/?q=tao3530 visited on Apr. 15, 2011.
Carlson et al., "Smart Reflex Power and Perfor-mance Management Technologies: reduced power consumption, optimized performance," IEEE Transactions on Consumer, Nov. 2008.
ICOM: 11 UHF Transceiver IC-F4029SDR—1.3.8.10 Instruction Manual, internet citation, Dec. 31, 2011. pp. FP. i-ii .1-47 .z. XP002693577. Retrieved from the Internet: URL:http://www.icom.co.jpjworldjsupportjdownloadjmanualjpdf/IC-F4029SDR 4a.pdf [retrieved on Mar. 11, 2013].
Anonymous: 11 User Manual LM851 Digital GSM/GPRS Mobile Phone, internet citation, May 18, 2010. pp. FP.i-viii .1-53. XP002693576. Retrieved from the Internet: URL:www.citltda.cljtcjcelgps man.pdf [retrieved on Mar. 11, 2013].
ETSI TS 145 001, V11.0.0 (Oct. 2012): Digital cellular telecommunication system (Phase 2+); Physical layer on the radio path, General de-scription (3GPP TS 45.001 version 11.0.0 Re-lease 11).
Extended European Search Report, Application No. 12154967.9, issued Jul. 5, 2012; 6 pgs.

* cited by examiner

MOBILE DEVICE FOR WIRELESS DATA COMMUNICATION AND A METHOD FOR COMMUNICATING DATA BY WIRELESS DATA COMMUNICATION IN A DATA COMMUNICATION NETWORK

FIELD OF TECHNOLOGY

The following relates to a mobile device for wireless data communication and a method for communicating data by wireless data communication in a data communication network.

BACKGROUND

In general, such device and method are used for the exchange of electronic data between two or more devices by wireless data communication. The communication devices may be part of a data communication network.

Among such data networks are so-called user or person localization systems which may be used, for example, in human health management. For example, dementia patients living in nursery homes often get lost on walks outside of their common surroundings if unattended. Therefore it is critical for nurses to be notified if their proteges intend to take a walk. A system supporting patients in critical situations transmitting their current location to the nurses is therefore needed.

A system referred to as KopAL system (Fudickar et al., "A Mobile Orientation System For Dementia Patients," in Proc. of International Conference on Intelligence Interactive Assistance and Mobile Multimedia Computing, Rostock, Germany, November 2009; Fudickar et. al., "KopAL—An Orientation System For Patients With Dementia," in Behaviour Monitoring and Interpretation—BMI. IOS Press, 2011, pp. 83-104) supports elderly suffering from potential dementia. They are equipped with mobile devices that autonomously take care of them by reminding them of upcoming appointments, recognizing critical situations (in case of falling or losing-tracks) and offering emergency-call functionality.

For localization system the use of different of technologies such as GPS-like satellite systems, GSM-like cellular radios, Wi-Fi, Bluetooth, RFID, and DECT was proposed. The location is predicted via received radio waves, e.g. by triangulation. The location prediction accuracy thereby depends mainly on the range, the measurements accuracy (next to the availability of reference nodes, their geometry and location information).

Radio signal quality is influenced when transmitted through materials such as water, metal or stone. In the frequency ranges of GPS and GSM these influences are problematic, making it hard to estimate a precise distance in buildings (indoor) (see Kaplan et al., Understanding GPS: principles and applications, 2nd ed. Artech House, 2005; Varshaysky et al., "Gsm indoor localization," Pervasive Mob. Comput., vol. 3, pp. 698-720, December 2007). As a result, outdoor localization techniques are not appropriate for indoor scenarios.

Several alternative techniques have been proposed for indoor localization, with deviation in precision of only a few centimeters. In systems using RFID (Ni et al., "Landmarc: indoor location sensing using active rfid," Wirel. Netw., vol. 10, pp. 701-710, November 2004; Cox et al., "Intellibadge: Towards providing location-aware value-added services at academic conferences," UbiComp 2003 Ubiquitous Computing, vol. 2864, pp. 264-280, 2003) or passive infrared (PIR) users are equipped with passive badges, which are identified by stationary receivers. The short transmission range of infrared (since requiring line of sight) assures a precise location, but requires a high density of receivers. Localization systems using RFID badges in contrast have limited precision caused by environmental influences on radio signal strength and low detection precision.

These approaches use artificial enriched environments which include increased deployment costs and privacy concerns and thereby have limited applicability.

An alternative to these artificial enriched environments are systems that compute the location on user devices, requiring little or no additional equipment in the environment. Therefore Bluetooth, Wi-Fi, Ultrasound, UWB, and even DECT are more suitable, since their algorithms can be executed within user attached devices (see Kyamakya et al., "An indoor Bluetoothbased positioning system: concept, implementation and experimental evaluation," International, 2003; Bahl et al., "RADAR: an in-building RF based user location and tracking system," INFOCOM 2000. Nineteenth Annual Joint Conference of the IEEE Computer and Communications Societies. Proceedings. IEEE, vol. 2, pp. 775-784 vol. 2, 2000; Hightower et al., "Practical lessons from place lab," IEEE Pervasive Computing, vol. 5, pp. 32-39, July 2006; Smith et al., "Tracking Moving Devices with the Cricket Location System," in 2nd International Conference on Mobile Systems, Applications and Services (Mobisys 2004), Boston, Mass., June 2004; Gezici et al., "Localization via ultra-wideband radios: a look at positioning aspects for future sensor networks," Signal Processing Magazine, IEEE, vol. 22, no. 4, pp. 70-84, 2005; M. Kranz et al., "A comparative study of DECT and WLAN signals for indoor localization," in 8th Annual IEEE Int'l Conference on Pervasive Computing and Communications (PerCom 2010). Mannheim, Germany: IEEE, March 2010, pp. 235-243)

The utilization of these localization techniques is challenging for several reasons. The distance between devices can be computed based on transmitted radio signals via either the angle of arrival (AOA), time based approaches (such as TOA, TDOA) or the received signal strength indicator (RSSI). The RSSI based distance calculation is the most practical for mobile devices, in common sense (Savarese et al., "Locationing in distributed ad-hoc wireless sensor networks," in in ICASSP, 2001, pp. 2037-2040). However, the radio signal strength is highly influenced by obstacles in the line of sight such as concrete walls, metal, humans or plants (Cheng et al., "Accuracy characterization for metropolitan-scale wi-fi localization," in Proceedings of the 3rd international conference on Mobile systems, applications, and services, ser. MobiSys '05. New York, N.Y., USA: ACM, 2005, pp. 233-245) causing reflections, refractions, diffractions, absorptions, polarizations and scattering of the radio-waves (J. D. Parsons, The Mobile Radio Propagation Channel, 2nd Edition, 2nd ed. Wiley, November 2000).

These effects are very critical within the spectrum of 2.4 GHz as utilized by Wi-Fi and Bluetooth (Hossain et al., "A Comprehensive Study of Bluetooth Signal Parameters for Localization," in Proc. IEEE PIMRC, Athens, Greece, September 2007; Zhou et al., "Position measurement using Bluetooth," IEEE Transactions on Consumer, 2006) and UWB (Cho et al., Performance Tests for Wireless Real-time Localization Systems to Improve Mobile Robot Navigation in Various Indoor Environments, 2008). Here the signal strength does not decrease steadily even in a line of sight (Elnahrawy et al., "The limits of localization using signal strength: a comparative study," 2004, pp. 406-414; Chandrasekaran et al., "Empirical evaluation of the limits on localization using signal strength," in Proceedings of the 6th Annual IEEE communications society conference on Sensor, Mesh and Ad Hoc Communications and Networks, ser. SECON '09. Piscataway, N.J., USA: IEEE Press, 2009, pp. 333-341; Otsason et al., "Accurate gsm indoor localization," in UbiComp 2005: Ubiquitous Computing, ser. Lecture Notes in Computer Science, M. Beigl, S. Intille, J. Rekimoto, and H. Tokuda, Eds. Springer Berlin/Heidelberg, 2005, vol. 3660, pp. 903-903).

As a result, the received signal strength must be interpreted in the context of the surroundings, requiring initial system calibration via multiple RSS sampling at calibration points during the so called off-line phase—similar to Wi-Fi or GSM fingerprints such as utilized by RADAR, PlaceLab or TV-GPS ("Rosum tv-gps," Website, 2011, available online at http://www.trueposition.com/visited on Sep. 15, 2011)). By inclusion of probabilistic methods such as particle filter, kayman filter or hidden marcov model the impact of imprecise radio strength measurements is reduced resulting in increased location accuracy.

However, the requirements for localization algorithms can not focus only on prediction accuracy. Instead, memory usage, time performance (Hightower et al., "Particle filters for location estimation in ubiquitous computing: A case study," in Proceedings of the Sixth International Conference on Ubiquitous Computing (Ubicomp 2004), ser. Lecture Notes in Computer Science, N. Davies, E. Mynatt, and I. Siio, Eds., vol. 3205. Springer-Verlag, September 2004, pp. 88-106) as well as energy consumption are most important when executed on mobile devices. Energy consumption was considered as a criteria, suggesting as a result the combination of sub 1 GHz and ultra sound for precision up to centimeters (see Balakrishnan et al., "Lessons from developing and deploying the cricket indoor location system," Tech. Rep., 2003).

Rice et al. analyzed wireless communication on android smart phones regarding the influence of message size and send buffer was analyzed. The idle power consumption of Wi-Fi, 3G and 2G communication networks was compared. It was found that the base power consumption of Wi-Fi was the lowest, while 2G had the highest consumption.

Most users recharge their devices context-dependent e.g. while sleeping. Only 28% of an interviewgroup recharge their devices with explicit knowledge of the current battery load. Our interviews with nurses and the elderly in home-stay had similar results, indicating the user's preference to recharge their mobile device over night. As a result, energy consumption is critical if falling below a periodic runtime of one day.

Document EP 2 169 924 A1 relates to a mobile wireless communications device that is configured to operate over five frequency bands, a 850 MHz global system for mobile communications (GSM) band, a 900 MHz GSM band, a DCS band, a PCS band and a WCDMA band (up to about 2100 MHz). Further, the device comprises a Near Field Communications circuit.

In document WO 2007/144014 A1 a mobile phone is disclosed that is operable for a number of frequency bands, including the GSM 900/1800 MHz network.

According to the GSM specification different frequency ranges that do not overlap with each other are used for sending data from a mobile device to a base station than for receiving data by the mobile device. For example, in the GSM 850 band data is sent from the mobile device to the base station in the frequency range from 824 to 849 MHz. But, data is received by the mobile device in the frequencies ranging from 869 to 894 MHz.

SUMMARY

An aspect relates to improved technologies for data communication with mobile devices in a wireless data communication network.

According to embodiments of the invention, a mobile device for wireless data communication and a method for communicating data by wireless data communication in a data communication network, respectively, are provided.

According to one aspect of the invention, a mobile device for wireless data communication is provided, the device comprising the following functional units: a central data processing unit, a memory unit, a display element, a user interface, a power supply unit, and a wireless transceiver configured for wireless data communication using the same frequency ranges of the sub 1 GHz frequency band for both sending and receiving data, each of the functional units being functionally connected to at least the central data processing unit.

According to another aspect of the invention, a method for communicating data by wireless data communication in a data communication network is provided, the method comprising steps of:

providing a mobile device, comprising a central data processing unit, a memory unit, a display element, a user interface, a power supply unit, and a wireless transceiver configured for wireless data communication using the same frequency ranges of the sub 1 GHz frequency band for both sending and receiving data, each of the functional units being functionally connected to at least the central data processing unit, providing a data communication unit configured for at least unidirectional wireless data communication in the sub 1 GHz frequency band, and in the data communication network, communicating data signals between the mobile device and the data communication unit by wirelessly transmitting the data signals in the sub 1 GHz frequency band.

Wireless data communication by the mobile device with other devices in the sub 1 GHz frequency band may be unidirectional or bidirectional. The data communication unit may be configured for using the same frequency ranges of the sub 1 GHz frequency band for both sending and receiving data.

A frequency range comprises all frequencies in an interval beginning with a start frequency and ending with a stop frequency, wherein the start frequency and the stop frequency are included in the interval. The start and stop frequency can have the same value reducing the interval to a single frequency. Preferably, the frequency range for sending data is exactly the same as the frequency range for receiving data. In this case, the start and stop frequencies for sending and receiving data are identical. Alternatively, the start frequency and/or the stop frequency of the interval used for sending data can be different from the start/stop frequencies of the interval used for receiving data, respectively, as long as at least a part of the sending interval overlaps with at least a part of the receiving interval. The overlap has to include at least one common frequency.

The wireless transceiver and/or the data communication unit may be further configured for using the same single frequency of the sub 1 GHz frequency band for both sending and receiving data.

The utilization of a sub 1 GHz transceiver, using especially the frequencies in the range of 6.765 to 6.795 MHz, 26.957 to 27.283 MHz, 40.66 to 40.70 MHz, 433.05 to 434.79 MHz, 868 to 870 MHz and/or 902 to 928 MHz for data transmission, for frequent wireless communication, preferably in case of low data rates, provides optimized energy characteristics and an increased transmission range, especially compared with Wi-Fi.

The functional connection of the functional units, as referred here, means a connection between the units linked to each other which allows for transmission of electronic data or electronic signals of different type, e.g. control signals or data. In addition to the connection of the functional units to the central data processing unit there may be functional connections between some of the functional units.

In a further development of the invention, the device is further comprising a wireless communication module configured to communicate data transmitted by at least one of the communication protocols from the following group: Wi-Fi, Bluetooth, UMTS, DECT, and NFC. Such types of communication protocols, in general, may also be referred to as radio communication standard protocols.

In an exemplary embodiment, the mobile device is further comprising an audio interface functionally connected to at least the central data processing unit. The audio interface may be provided with at least one of a microphone and a speaker.

In another exemplary embodiment, the mobile device is further comprising a memory device interface configured to receive an external memory device. This, for example, allows for extending storage capacity of the mobile device.

In an exemplary embodiment of the invention, the mobile device is further comprising a G-sensor element functionally connected to at least the central data processing unit. In an exemplary embodiment, the G-sensor element is provided with at least one three axis G-sensor.

The mobile device is further comprising a touch interface functionally connected to at least the central data processing unit. The touch interface may be provided with a touch screen element, the touch screen element being part of the display element.

In a further development of the invention, the mobile device is a mobile phone.

Some or all functional components may be received in a device housing.

With respect to the method for communicating data by wireless data communication in the data communication network, in a further embodiment the data communication unit is provided in a device selected from the following group: an actor device, a sensor device, a game device, a device of a navigation system, a device of a localization system, and a device in a home network. At least one of the sensor device and the actor device may be provided in a wireless sensor-actor network. Also, a sensor network or an actor network may be provided. Wireless sensor and actor networks (WSANs) refer to a group of sensors and actors linked by wireless medium to perform distributed sensing and acting tasks. The realization of wireless sensor and actor networks (WSANs) satisfies the requirements introduced by the coexistence of sensors and actors. In WSANs, for example, sensors gather information about the physical world, while actors take decisions and then perform appropriate actions upon the environment, which allows a user to effectively sense and act from a distance. Further, monitoring applications define an important class of applications used in wireless sensor networks. In these applications the network perceives the environment and searches for event occurrences (phenomena) by sensing different physical properties, such as temperature, humidity, pressure, ambient light, movement, and presence (for target tracking).

In another embodiment, the data communication unit is provided in a device being part of a localization, a tracking or a navigation system, preferably a system for localizing people in an area and/or a building. In still another embodiment, the data communication unit may be used in a network adopted for wireless home computer networking. Millions more have yet to build their first home network. For example, files are shared between computers using floppy disks or USB keys. In some design, the home network allows to share these files much faster and more conveniently by utilizing the available connections between computers. Home networks allow sharing of other things, too, like a printer and an Internet connection. Also, home networks may create the possibility to use new applications like multi-player online games.

In another embodiment, the data communication unit is provided in a game device. Within such an embodiment, for example, the communication may occur as follows: Movements or actions captured by external sensory which may be attached to a sport device, such as a bicycle, lead to a transmission of movement data to the communication unit. On the communication unit this data is interpreted as game interaction e.g. for navigating a player character. An alternative approach is the manipulation of external game systems (e.g. a gaming console) where the communication unit acts as gaming device—to interact with the gaming console. The sensor readings of sensory, included in the communication unit therefore are transmitted to the gaming system.

In still a further embodiment, in the method the step of communicating the data signals comprises a step of communicating at least one data signal type from the following group: an actor signal, a sensor signal, a game control signal, a navigation signal, a tracking signal and a localization signal. By such a method for localizing the mobile device, thereby localizing the user carrying the device, can be implemented.

The method further comprises a step of communicating further data signals, the further data signals being wirelessly transmitted in a frequency band which is different from the sub 1 GHz frequency band and being communicated between at least one of the mobile device and the data communication unit and the mobile device and another data communication unit of the data communication network. For example, the further data signals may be transmitted by at least one of the communication protocols selected from the following group: Wi-Fi, Bluetooth, UMTS, DECT, and NFC.

BRIEF DESCRIPTION

Figure 2:
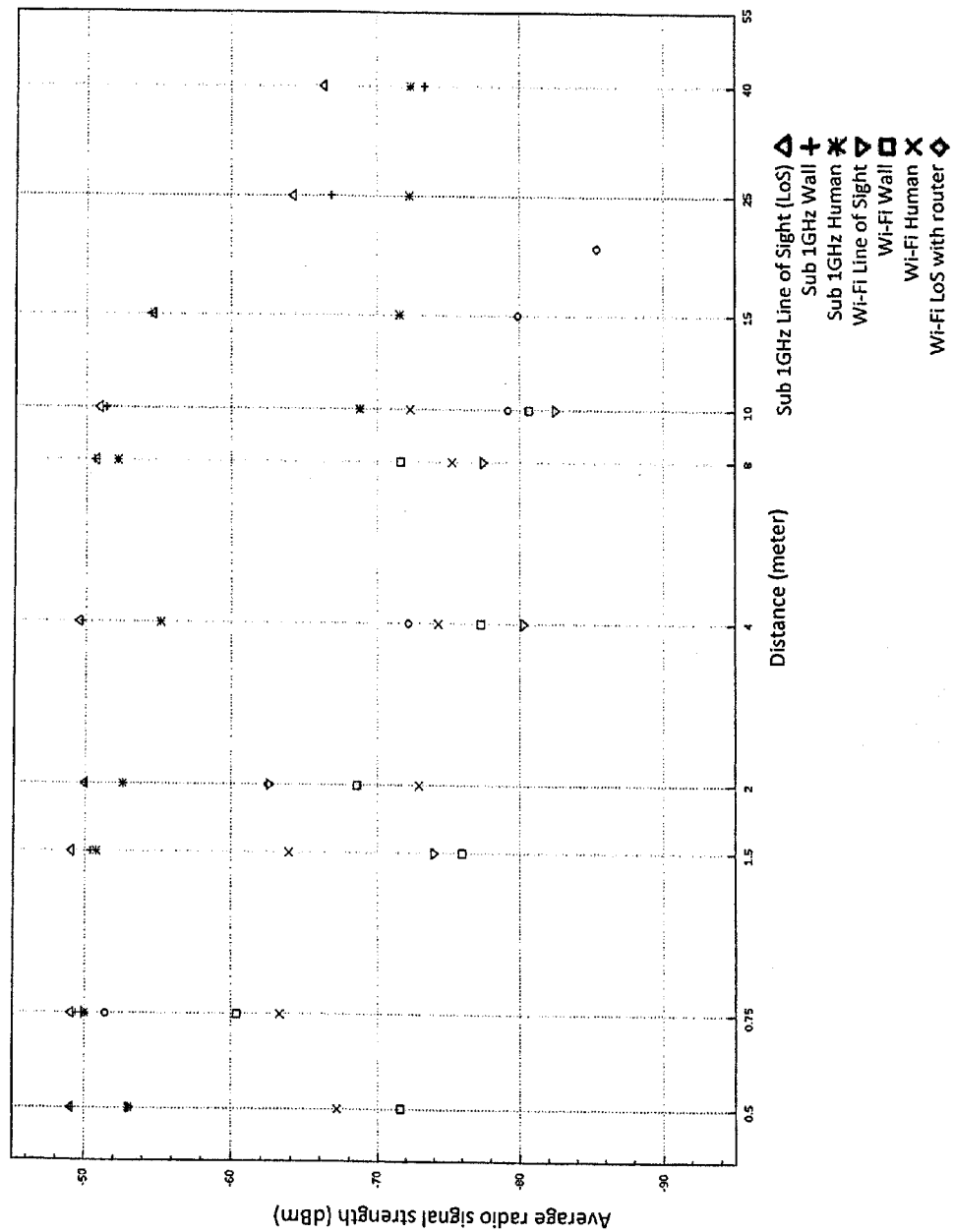
Figure 3:
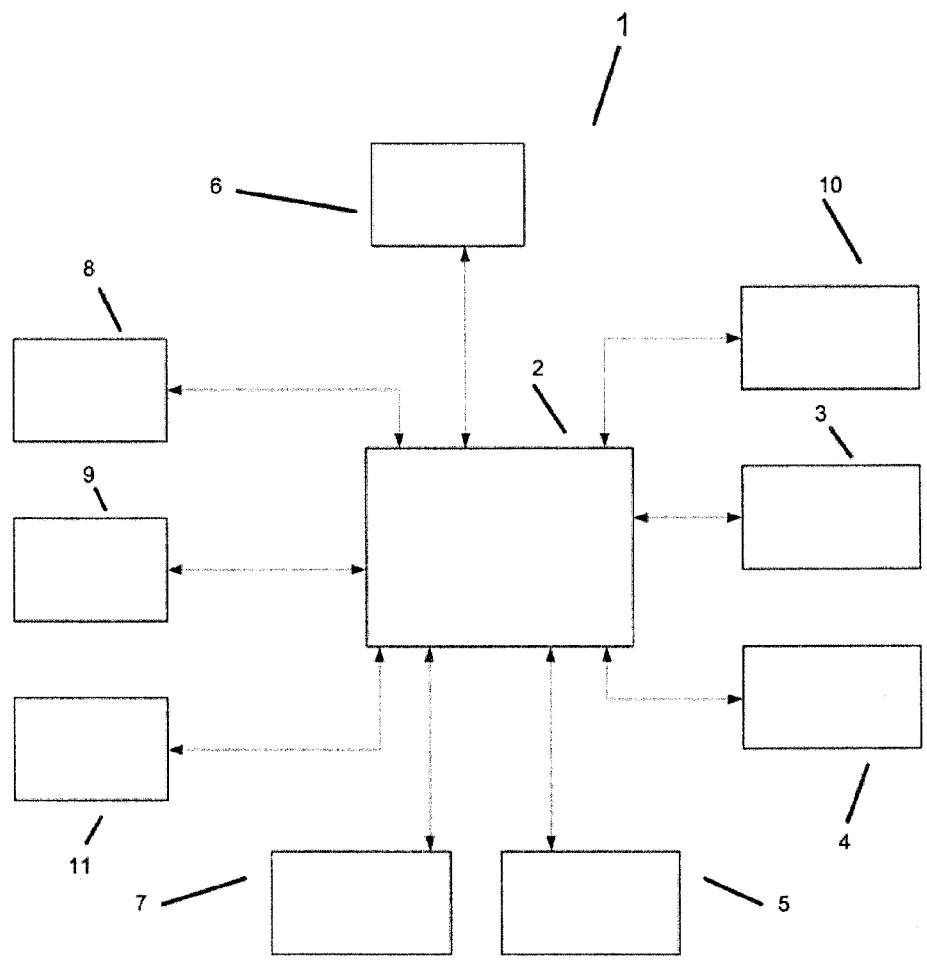
Figure 4:
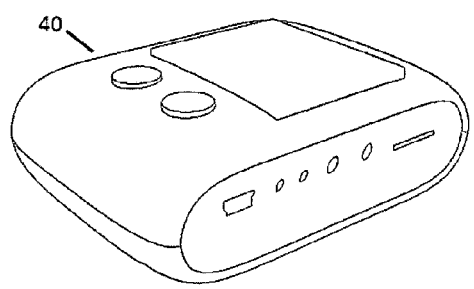
Figure 5:
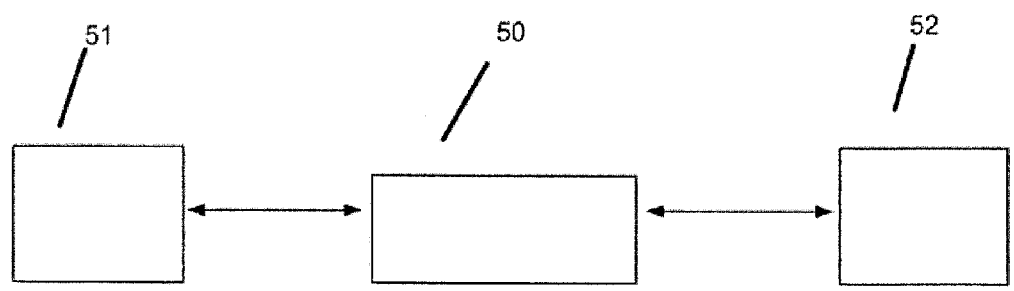
Figure 6:
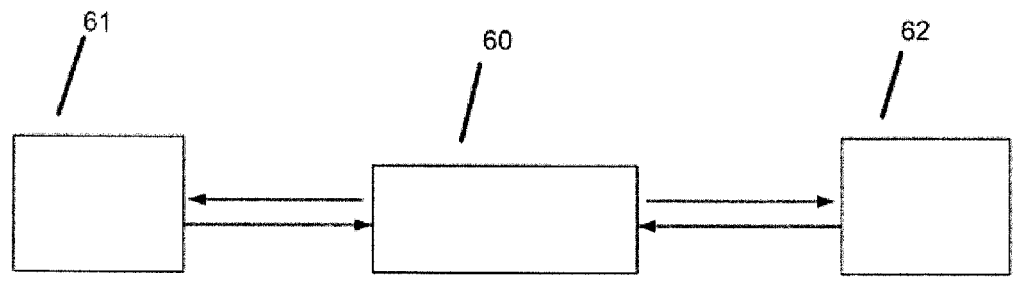
Figure 7:
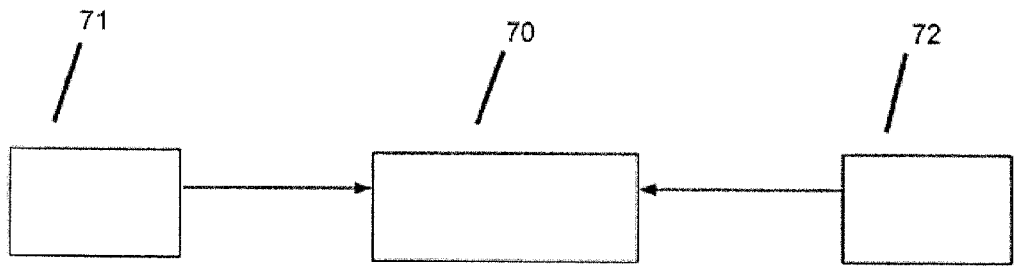

In the following, the invention will be described in further detail, by way of example, with reference to different embodiments. The figures show:

FIG. 1 radio range and strength study building strength;

FIG. 2 a graphical representation of radio range and strength study results;

FIG. 3 a schematic representation of the mobile device;

FIG. 4 a device housing of the mobile device;

FIG. 5 a schematic representation of an arrangement comprising a mobile device wirelessly communicating with two modem devices;

FIG. 6 a schematic representation of an arrangement comprising a mobile device wirelessly communicating with a stationary sensor device and a mobile sensor device of an actor network; and FIG. 7 a schematic representation of an arrangement comprising a mobile device wirelessly communicating with a stationary actor device and a mobile actor device of an actor network.

DETAILED DESCRIPTION

First, the energy consumption aspect will be considered.

While an uptime of 16 hours per charge for the mobile device used in the nursery home and mobile devices in general is necessary, the real-world device's uptime with 6 hours per charge when using frequent Wi-Fi based localization does not fit this requirement. The uptime could not be significantly extended by software adjustments (such as the localization messages transmission frequency reduction or further operating system optimizations), which had marginal impact on the overall consumption. As a result the devices energy consumption was studied on a per chip base, to identify potential critical components. The measurements were conducted on an Openmoko Freerunner smartphone running an Android kernel 2.2. The measurements have been executed within a dry, well-tempered (20 degree Celsius) office building using a certified Agilent U1253B multimeter for measuring the current and another multimeter for measuring the USB voltage. The multimeters were attached to the USB cable supplying the phone with power. The minimal energy demand was determined by using only the CPU and memory of the device and switching off all unused components, like GPS, Wi-Fi or Bluetooth. Step by step each component was activated and their power consumption was measured in the lowest available energy mode. The maximal energy consumption was measured using the highest load.

The power consumption results for the Openmoko are representative for common smartphones, since the chip-sets (such as processor and memory, VGA-display, 3G, Wi-Fi, Bluetooth, GPS and acceleration sensors) power characteristics are comparable. The overall energy consumption of the Openmoko resides between 155 mW (with only memory and processor active) and 4 W (full system load), as shown in Table I.

TABLE I

| Component | Processor and memory | Display | SD | Speaker | GPS | Wi-Fi | Bluetooth | UMTS |
|---|---|---|---|---|---|---|---|---|
| minimal consumption | 155 (12%) | 34 (3%) | 74 (6%) | 65 (5%) | 181 (14%) | 148 (11%) | 136 (11%) | 497 (38%) |
| maximal consumption | 1184 (29%) | 656 (16%) | 111 (3%) | 423 (10%) | 181 (5%) | 734 (18%) | 136 (3%) | 632 (16%) |

The processor and memory energy consumption is between 155 mW and 1184 mW. The Wi-Fi transceiver (using IEEE 802.11g) consumes between 148 mW (in standby), 518 mW (listening) and 734 mW (transmitting) Infrastructure and ad-hoc mode differ by maximal 37 mW. The display's consumption ranges from 34 mW to 656 mW, depending on the selected brightness level (30%-100%), with a consumption of 102 mW at 50% brightness. Bluetooth has a consumption of 136 mW and a difference between listening and transmitting mode was not recognized. The 3G transceiver has a consumption between 497 mW and 632 mW, and GPS consumes 185 mW at a fixed geographical position. The SD card reader consumes between 74 mW (idle) and 111 mW (reading/writing).

With the device's uptime of 6 hours per charge in a nursery home an average energy consumption of 0.8 Wh is calculated when using the 1200 mAh battery at 3.7 V of the Openmoko. In this case the Wi-Fi transceiver is in listening mode most of the time, while speakers and LCD are used sporadically. The SD card is needed to boot the OS and the KopAL system. UMTS, Bluetooth and GPS are all deactivated. We conclude, that in this scenario Wi-Fi as well as processor and memory running KopAL are the components with the highest energy demand. A synthetic test was performed in order to identify the influence of Wi-Fi on the overall uptime. First, an Openmoko running the KopAL system and Wi-Fi based localization was tested and second the KopAL system without Wi-Fi based localization was tested. A runtime of 7:30 hours was measured when using Wi-Fi. With Wi-Fi disabled and the localization algorithm using dummy data, a run time of 9:56 hours was measured leading to run time increase of 31%.

Thus, the utilization of Wi-Fi for continuous localization is energy inefficient. For such tasks future mobile devices must support alternative, more energy efficient communication standards.

Next, communication standards for localization systems are considered.

The short device uptime is mainly a result of the frequent Wi-Fi activation, as the smartphone energy consumption study has indicated. The choice of the localization algorithm (as long as utilizing Wi-Fi RSSI measurements) has no significant impact on the energy consumption as the following factors suggest 1. Mobile devices receiving messages from stationary routers (as 1-hop messages) and frequently calculating the current location, is an exemplary approach for continuous localization and tracking. The following approaches are practical in general:

1) The mobile devices transmit hello messages frequently to the stationary routers. Afterwards the router transmits the collected data including the mobile device ids, the received signal strength and timestamps to a central server which frequently calculates the mobile devices locations.

2) The mobile devices listen on messages, transmitted by stationary routers and frequently transmit the collected data to a central server to calculate the devices current location.

3) The mobile devices listen on hello messages send by stationary routers (as 1-hop messages) and frequently calculate the current location on their own.

While the first two approaches relieve the mobile devices from processing its own location, it requires the frequent transmission of short messages and the receiving of the Probabilistic algorithms increase the energy consumption and therefore their usage on mobile devices is not considered.

When taking potential traffic forwarding into account, the first two approaches increase the overall network load. By taking into account potential absence of Wi-Fi barks the latter approach won't result in any message transmissions. As a result even though requiring continuous listening, the local execution of the localization algorithm on the basis of received hello messages for proactive localization is the most energy efficient approach (as long as the localizations algorithm is efficient and the localization data is not needed at the server).

The Wi-Fi standard enables high data-rates and transmission ranges up to 100 meters. However, because of its high energy consumption, the utilization of Wi-Fi for continuous availability (including frequent channel listening) is not optimal for devices with limited power sources. Since the amount of transmitted data for localization is marginal (consisting of an identification eventually extended by timestamps and geographic description), high data rates are not a relevant factor. Instead low energy consumption and long radio range are more important criteria.

The energy consumption of Bluetooth (IEEE 802.15.1 ("IEEE 802.15.1-2005 IEEE Standard for information technology—Telecommunication and information exchange between systems—LAN/MAN—Part 15.1: Wireless Medium Access Control (MAC) and Physical Layer (PHY) specifications for Wireless Personal Area Networks (WPANs)," 2005)) transceivers is significant lower than the one of Wi-Fi transceivers. However, the supported communication range of Bluetooth is limited by specification from 1 meter up to 100 meters—depending on the build in chip class and antennas. Nowadays smartphones include Bluetooth class 2 chip sets, which range is (under best conditions) up to 10 meters. Bluetooth utilizes the same 2.4 GHz radio spectrum as Wi-Fi, which provides a high data rate, but has a lower transmission range and higher object diffusion compared to lower frequencies (when using the same transmission power).

For continuous localization only a low data rate is needed. High transmission range and low object diffusion are advantageous. The sub 1 GHz spectrum (the frequencies in the range of 6.765 to 6.795 MHz, 26.957 to 27.283 MHz, 40.66 to 40.70 MHz, 433.05 to 434.79 MHz, 868 to 870 MHz and/or 902 to 928 MHz) appears to be a suitable alternative by supporting low power connectivity and potentially large transmission ranges (up to 8 kilometers at 2.4 kBps and 300 meters at 250 kBps 2). Current sub 1 GHz transceivers such as the CC1100, which uses the 868 MHz frequency, have a transmit data rate up to 76.8 kBaud, and an energy consumption below 80 mW.

To verify the specified characteristics an evaluation was conducted within a realistic environment comparing the Wi-Fi and sub 1 GHz (868 MHz) transmission ranges and signal FIG. 1 shows radio range and strength study building strength.

The radio measurements were conducted within the second floor of an office building with varying obstacles such as none, walls and humans and varying distances between 0.25 and 40 meters. The signal propagation along a corridor was measured with several halls (white in FIG. 1). The surrounding walls were either concrete (displayed as fat) or plasterboard. A fixed and open metal framed glass door is in a distance of 14 meters. Each result is the average of hundred measurements, which were conducted between two nodes (one slave and one master node). The slave node was placed at the one end of the building within a laboratory room and answered the requests. The master nodes' position shifts along the corridor on specified distances. The nodes have been placed in realistic height (slave on 95 cm, master on 64 cm). The human, acting as obstacle during measurements, stands in 60 cm distance to the master node in direct line of sight. The concrete wall was placed in a distance of 1.3 meters in front of the slave node. The orientation of the antennas was constant. In addition all nodes were connected to power line during the measurements, to pretend variations caused by voltage shifts. To minimize the influence of several installed Wi-Fi Routers to the conducted measurements, the unused Wi-Fi channel 10 (2.457 GHz) was used on the measurement devices.

The results shown in FIG. 2 indicate significant reduced influences of obstacles and increased transmission ranges if utilizing sub 1 GHz. Humans have less influence on the signal distribution in comparison with Wi-Fi. In addition, with Wi-Fi a high packet loss ratio of up to 50% starting at a distance of 10 meters is recognized. The reduced sizes of smartphones Wi-Fi antennas shorten the transmission range, resulting in 10 meters with two smartphones and 20 meter when exchanging data with a Linksys WRT54GL router. The maximal measured in house distance with 868 MHz transceivers and a data rate of 250 kBps was limited by the building size. An additional measurement in an open FIG. 2 shows a graphical representation of radio range and strength study results space (a field) proofed connectivity of more than 250 meter distance. At greater distance the packet loss ratio increases in 868 MHz as well. In-house measurements indicated a packet loss ratio of 65% at a distance of 40 meters between master and slave nodes.

In Table II the energy consumption is shown for sending resp. receiving messages using the Openmoko smartphone and Wi-Fi in comparison with the sensor nodes Mica2 using sub 1 GHz.

TABLE II

|  | Wi-Fi Openmoko | 868 MHz Mica2 |
| --- | --- | --- |
| Sending messages | 150 mA | 27 mA |
| Receiving messages | 120 mA | 10 mA |

The amount of energy required for sending and receiving data is significantly lower when using 868 MHz in comparison to Wi-Fi.

The combination of high energy efficiency, longer communication ranges and reduction of obstacles influence on the signal strength makes the sub 1 GHz frequency spectrum a good choice for indoor localization.

A mobile device was designed as a battery powered handheld device which includes a sub 1 GHz MHz transceiver next to common wireless communication interfaces to allow low-power communication for proactive localization or external sensing.

FIG. 3 shows a schematic representation of the mobile device 1.

In the embodiment shown, there are two boards, the system board and the I/O board. The TAO3530W System on Module board ("Tao 3530w," Website, 2011, available online at url http://www.denx-cs.de/?q=tao3530 visited on Apr. 15, 2011) was used as the system board. The I/O board is a new designed PCB including additional I/Os and components.

All I/Os and external components are grouped around a central data processing unit 2 provided with the Texas Instruments OMAP 3530 system on a chip (SoC). In addition to the SoC, the system board includes a Marvell 8686 802.11 b/g Wi-Fi module), 128 MByte RAM and 256 MByte NAND Flash.

The OMAP 3530 uses an ARM Cortex-A8 CPU clocked at 600 MHz and has additional internal components like DSP core, audio codec or cryptography core. It offers enough computational power to execute complex tasks such as speech synthesis. Via two 100 pin NAIS connectors the system board is stacked to the I/O board.

The I/O board may be designed as a two layer printed circuit board (PCB) and extends the functionality of the system board by adding several interfaces and additional components. It includes a low-voltage CC1100 ("Texas instruments CC1100 sub 1 GHz radio chip") sub 1 GHz transceiver to extend the Wi-Fi (high-speed and high-power) wireless communication with a low-power and low-speed communication. The used Texas Instruments CC1100 RF Transceiver is connected to the OMAP 3530 using the MSPI4 interface.

A three axis G-Sensor 3 (ADXL345) allows the detection of movement and can be used to detect gestures or falls. It includes on chip data pre-processing, to support processor power down during detection. A micro SD card 4 is used to extend the storage capabilities of the device and can also be used to boot the OS for quick tests and debugging.

An audio interface 5 consists of a microphone, a pre-amplifier, a speaker as well as line-in and line-out connectors using 3.5 mm jacks. A NHD-3.5-320240-MF display can be attached to the board including touch screen functionality 6.

The Nokia BP4L battery is used as power supply 7, which provides 1500 mAh at 3.7 V. The battery can be charged via USB and the power supply is automatically switched from battery to USB when USB is plugged-in to the I/O board. Therefore, dedicated ICs for charging the battery and supplying the different voltages are used.

In addition, a debug board was created to allow the connection of USB devices, requiring USB-host functionality 8.

Also, there are a memory unit 9 and a display unit 10. A WLAN 11 element is also provided for data communication.

Since the hardware found in the mobile device 1 combines high computational power with mobility in a small package, it is comparable to smartphones. The mobile device 1 has a size of 63 mm×50 mm and a total height of 13 mm including the device boards and the battery.

FIG. 4 shows a device housing 40 of the mobile device 1.

With respect to the software implementation on the mobile device, the ARM Cortex A8 in the OMAP 3530 is capable to run operating systems such as Linux, Android or Mee-Go. An Angstrom Linux distribution based on the 2.6.32 kernel was adapted to support the special conditions (such as sub 1 GHz support). The CPU speed currently is dynamically set depending on the actual computation requirements. The current version contains driver for all included components such as: Wi-Fi modules, sound, power management, USB Net, I2C, SPI, CC1100 and ADXL345 accelerometer all chips can be activated and deactivated dynamically via Smartreflex (Carlson et al., "Smart Reflex Power and Performance Management Technologies: reduced power consumption, optimized performance," IEEE Transactions on Consumer, November 2008). Both the CC1100 chip and the ADXL345 chip can remain activated (awaiting package transmissions and fall situations) while the CPU is in stand-by. In such a case both chips, can wake up the CPU via interrupts. Ssh connectivity is supported either via USB or Wi-Fi. The resulting configuration can be handled equal to any desktop computer running with an adequate Linux distribution. Even the installation of Java based applications is unproblematic.

Following, aspects of the evaluation of the mobile device described above are discussed.

First, the energy consumption is considered.

The energy consumption of the mobile device was measured while being powered via USB. As shown in Table III, the overall energy consumption of the mobile device resides between 0.9 W and 3.5 W depending on the activated chips and the configured processor speeds. In addition the mobile device supports a suspend to RAM power mode with a consumption of 736 mW. The accelerometer (ADXL345) with a consumption between 9 mW (at 100 Hz) and 28 mW (at 800 Hz) and a maximal proportion of the overall energy consumption of 1% enables the device to continuously measure the acceleration in order to perform a fall detection. When activated, the sub 1 GHz transceiver (CC1100) consumes 42 mW (during listening or transmitting with 9.6 dBm, None Return to Zero encoding and a data rate of 38.4 kBit/s) and thereby can always remain activated without a significant influence on the overall device uptime.

The processor, memory and SD card consume more energy than the one of the Openmoko with a minimal consumption of 941 mW together. While the Openmoko operating system is already optimized for power savings, the mobile device yet is partly optimized. 3 The utilization of the processors suspend to RAM mode with an 736 mW in combination with the WoR (Wake-on-Radio) and the interrupt when recognizing falls leads to high energy efficiency. The Wi-Fi chip set (when transmitting at 13 db) consumes between 974 and 1164 mW (depending on the traffic load). As a result it should be (similar to the Openmoko) deactivated most times. Similar to the measurement performed on the Openmoko the power consumption did not depend on the chosen connection mode (ad-hoc vs. managed). When programmed with a focus on energy efficiency the mobile device will continuously consume about 806 mW (with processor suspended to RAM, system installed on NAND flash, G-sensor continuously listening at 800 Hz, and Sub1 GHz frequently listening for and transmitting messages.

TABLE III

| Component | Por and memory | Wi-Fi | CC1100 | ADXL345 | Speaker |
| --- | --- | --- | --- | --- | --- |
| min Consumption | 941 (38%) | 974 (39%) | 42 (2%) | 9 (0%) | 537 (21%) |
| max Consumption | 1577 (45%) | 1164 (33%) | 42 (1%) | 28 (1%) | 703 (20%) |

In case a message is received, a fall is detected or an internal task has been handled, the consumption maximally increases up to 2 W for a short period of time. As a result the previous identified, the problem of high energy consumption in the process of wireless in-house localization has been resolved.

Next, an uptime benchmark is done.

A benchmark was conducted to clarify the achieved power savings, comparing Wi-Fi and CC1100 based communication. Therefore two configurations were executed on the mobile device with an initially charged battery. The basic configuration included processor with normal load and the operating system booted from SD card. The first experiment uses the CC1100 sub1 GHz transceiver. The second one uses the Wi-Fi transceiver for continuous transmission of one message per second. The maximal uptime was measured.

While the CC1100 configuration enabled the mobile device to run for 487 minutes, the Wi-Fi configuration just last for 226 minutes. The localization without any active radio transceiver (using dummy radio readings) lead to 534 minutes uptime. As a result the CC1100 radio transceiver utilization extends the uptime of the mobile device by 115%, compared to Wi-Fi utilization.

A mobile hand-held device such as smartphones, PADs or laptops as well as common radio transceivers (e.g. Bluetooth, Wi-Fi and 3G) comprising a sub 1 GHz transceiver into is provided. The study of the energy consumption of current smartphones indicates that frequently used Wi-Fi transceivers, e.g. when utilized for localization, reduce device uptime by 31%. As a result such transceivers are not adequate for frequent usage such as proactive indoor device localisation. The sub 1 GHz spectrum instead is a more adequate for applications with low data rates, since it combines higher energy efficiency and larger transmission ranges (up to 8 km). The high energy efficiency of the new concept was verified by energy measurements and a comparison of the transceiver utilization. As a result, using the CC1100 radio transceiver instead of Wi-Fi extends the uptime of the mobile device by 115%.

The mobile device's applicability is not limited to assisted living. Instead, enhancing future hand-held devices such as smartphones, PADs and laptops with sub 1 GHz transceivers will open a field of novel applications and scenarios in general. A selection of such applications is discussed below.

Wireless sensor networks (WSN) are intended to collect environmental data, which is transmitted to a base station where it is processed and stored. The sub 1 GHz radio spectrum alongside the 2.4 GHz radio spectrum is quite popular in WSNs because of the good characteristics (such as increased transmission ranges and low energy consumption). However, wireless sensor nodes still remain in niche market such as habitat monitoring, agricultural or military applications. The available product spectrum ranges from "scientific solutions" such as the Mica2 platform to low cost home consumer products such as wireless bells, switches or weather sensors.

Home automation will also benefit from the integration of sub 1 GHz transceivers in future smartphones. All current developments expect the existence of a gateway to interconnect actor networks and sensor network with the control unit (with increasing smartphone support). Wi-Fi's energy inefficiency prohibits a continuous connection to those networks. While these solutions currently are based on Wi-Fi for communication, sub 1 GHz transceivers will enable the continuous and direct interaction between smartphones and home automation devices. If home automation devices can precisely and continuously locate a user's smartphone and communicate with surrounding sensor- or actor nodes, smart home scenarios in which music is being streamed to only those rooms the user is currently in, light bulbs that automatically switch off when all users have left a room or alarm clock applications that can activate the coffee machine in the morning may become practical reality.

The direct communication between smartphones and sensors or actors increases the potential contextual user knowledge and may significantly increase the precision of future mobile applications. The transceiver's negligible energy costs do not limit the inter-device communication anymore and allow frequent communication with available sensors, actors and/or other mobile devices.

FIG. 5 shows a schematic representation of a network arrangement comprising a mobile device 50 wirelessly communicating with two modem devices 51, 52 located in the neighbourhood to the mobile device 50.

The mobile device 50 with a build in sub 1 GHz modem can be used for localization by utilizing received packets of the neighbouring devices 51, 52. Therefore, the mobile device 50 must know the current locations of the modem devices 51, 52. The position is either defined within a local map, or included in at least some of the transmitted messages. The distance between the mobile device 50 and their neighbours 51, 52 can be calculated either based on the signal strength of received packets, or based on the packets time of flight (ToF). Compared to Wi-Fi and Bluetooth (which frequencies are more influenced by channel interferences), mobile devices can autonomously calculate their current position within buildings or outside with higher precision. The long transmission ranges of radio-signals in the sub 1 GHz band increase the amount of nodes within direct communication range (compared to Wi-Fi or Bluetooth), which as well increases the precision of the localization.

An additional advantage is the high energy efficiency of sub 1 GHz modems, which makes continuous listening uncritical to the all over system performance with less than 1% of the overall energy consumption.

FIG. 6 shows a schematic representation of a network arrangement comprising a mobile device 60 wirelessly communicating with a stationary sensor device 61 and a mobile sensor device 60 of an actor network.

Wearable sensors which may also referred to as body area sensors are a growing market field. Devices such as blood pressure-sensors or emergency devices are worn continuously by an increasing number of users. The integration of sub 1 GHz modems in the mobile device 60 which may be provided as a smart phone supports the continuous communication between wearable sensory with mobile phones which can directly react on transmitted sensor data, e.g. in case of critical vital stages the user can be informed via its smart phone, or alarms are transmitted via the smart phone to emergency institutions or relatives. The sensor devices 61, 62 can be configured directly from the mobile device 60. The continuous availability of the network which is required to achieve these functionalities without resulting in significantly reduced device runtimes is achieved by the high energy efficiency of the network transceivers and modems as found in sub 1 GHz modems.

The continuous interaction with sensory placed in the surroundings thereby is a practical use case, next to the communication with sensory worn on the body.

FIG. 7 shows a schematic representation of a network arrangement comprising a mobile device 70 wirelessly communicating with a stationary actor device 71 and a mobile actor device 72 of an actor network.

The direct communication of mobile devices and actors via sub 1 GHz networks enables an energy efficient adjustment of surrounding devices, e.g. the switching of a lamp, or the controlling of blinds or multimedia systems. Next to reduced response times, the configuration of actor and sensor networks is simplified since no gateways are anymore required. In addition, status updates of the actors or sensors can be received continuously by the mobile device 70, enabling them to react upon them instantly, without significantly reducing the device runtime.

The features disclosed in this specification, the figures and/or the claims may be material for the realization of the invention in its various embodiments, taken in isolation or in various combinations thereof.

The invention claimed is:

1. A method for communicating data by wireless data communication in a data communication network, the method comprising steps of:
provided a mobile device, the mobile device comprising a central data processing unit, a memory unit, a display element, a user interface, a power supply unit, and a wireless transceiver configured for wireless data communication using the same frequency ranges of the sub 1 GHz frequency band for both sending and receiving data, wherein each of the functional units being functionally connected to at least the central data processing unit;
providing a data communication unit configured for at least unidirectional wireless data communication in the sub 1 GHz frequency band; and
in the data communication network, communicating data signals between the mobile device and the data communication unit by wirelessly transmitting the data signals in the sub 1 GHz frequency band.

2. The method according to claim 1, wherein the data communication unit is provided in a device selected from the following group: an actor device, a sensor device, a game device, a device of a navigation system, and a device of a localization system.

3. The method according to claim 1, wherein the step of communicating the data signals comprises a step of communicating at least one data signal type from the following group: an actor signal, a sensor signal, a game control signal, a navigation signal, a tracking signal, and a localization signal.

4. The method according to claim 1, the method further comprising a step of communicating further data signals, the further data signals being wirelessly transmitted in a frequency band which is different from the sub 1 GHz frequency band and being communicated between at least one of the mobile device and the data communication unit and the mobile device and another data communication unit of the data communication network.

* * * * *